United States Patent [19]

Davis

[11] E Re. 30,803

[45] Reissued * Nov. 24, 1981

[54] COLORLESS RECORDING PAPER

[75] Inventor: Chester Davis, Cincinnati, Ohio

[73] Assignee: Scott Paper Company, Philadelphia, Pa.

[ * ] Notice: The portion of the term of this patent subsequent to Jul. 6, 1982, has been disclaimed.

[21] Appl. No.: 850,034

[22] Filed: Nov. 9, 1977

Related U.S. Patent Documents

Reissue of:

[64] Patent No.: 3,278,327
Issued: Oct. 11, 1966
Appl. No.: 372,362
Filed: Jun. 3, 1964

U.S. Applications:

[63] Continuation-in-part of Ser. No. 200,052, Jun. 5, 1962, Pat. No. 3,193,404, which is a continuation-in-part of Ser. No. 800,377, Mar. 19, 1959, abandoned, which is a continuation-in-part of Ser. No. 658,249, May 10, 1957, abandoned, which is a continuation-in-part of Ser. No. 533,877, Sep. 12, 1955, abandoned, and Ser. No. 533,878, Sep. 12, 1955, abandoned.

[51] Int. Cl.[3] ..... B41M 5/14
[52] U.S. Cl. ..... 282/27.5; 346/135.1
[58] Field of Search ..... 282/27.5; 346/135; 427/150, 288; 101/426, DIG. 1; 106/31; 260/391, 570 R, 501.18, 501.21

[56] References Cited

U.S. PATENT DOCUMENTS

| | | | |
|---|---|---|---|
| 2,164,685 | 7/1939 | Kinyon | 427/153 X |
| 2,286,169 | 6/1942 | Heckenbleikmer | 260/349 |
| 2,307,813 | 1/1943 | Wayne | 260/456 A |
| 2,309,829 | 2/1943 | Davis et al. | 260/456 R |
| 2,332,696 | 10/1943 | Champion | 427/146 X |
| 2,518,249 | 8/1950 | Ott | 260/349 |
| 2,525,052 | 10/1950 | Van Der Auwera | 96/84 R |
| 2,557,924 | 6/1951 | Schaad | 260/349 |
| 2,559,351 | 7/1951 | Drake et al. | 427/282 |
| 2,634,677 | 4/1953 | Klimkowski | 101/DIG. 1 X |
| 2,646,367 | 7/1953 | Davis et al. | 282/27.5 X |
| 2,654,673 | 10/1953 | Steinhardt | 101/DIG. 1 X |
| 2,695,245 | 11/1954 | Compton | 427/150 X |
| 2,755,203 | 7/1956 | Stallmann | 101/DIG. 1 X |
| 2,900,388 | 8/1959 | Tien | 260/295 H |
| 2,927,040 | 3/1960 | Davis | 427/150 X |
| 2,927,041 | 3/1960 | Davis | 101/DIG. 1 X |
| 2,948,753 | 8/1960 | Kranz | 260/570 R X |
| 2,995,465 | 8/1961 | Steiger | 428/427 |
| 2,995,468 | 8/1961 | Richey | 428/511 |
| 3,096,189 | 7/1963 | Kranz et al. | 106/236 |
| 3,193,404 | 7/1965 | Davis | 427/288 |

FOREIGN PATENT DOCUMENTS

| | | | |
|---|---|---|---|
| 507001 | 11/1954 | Canada | 427/150 |
| 14822 | of 1888 | United Kingdom | 260/390 |

OTHER PUBLICATIONS

Karrer, "Organic Chemistry", 1946, p. 406.

Hinsberg, "Ueber Benzolsulfinsäure als Reagens. II", *Berichte der Deutschen Chemischen Gesellschaft,* vol. III (1897), pp. 2803–2805.

Hinsberg, "Über die Reaktion Zwischen Aromatischer Sulfinsäure und Di- und Triphenyl-Carbinol", *Berichte der Deutschen Chemischen Gesellschaft,* vol. 50, (1917), pp. 468–473.

Beilsteins Handbuch der Organischen Chemie, Vierte Auflage, Dreizehnter Band, 1930, pp. 700 and 704.

*Primary Examiner*—James R. Hoffman
*Attorney, Agent, or Firm*—Connolly and Hutz

[57] ABSTRACT

*Described herein are transfer and manifolding sheets having upon their surface a coating containing a substantially colorless dye salt derived from an organic sulfinic acid and an arylmethane dye base characterized by a logarithmic dissociation constant below 7, which upon transfer to a suitable receiving sheet is dissociated to the intensely colored ionic form of the dye to furnish a colored print.*

16 Claims, No Drawings

COLORLESS RECORDING PAPER

Matter enclosed in heavy brackets [ ] appears in the original patent but forms no part of this reissue specification; matter printed in italics indicates the additions made by reissue.

*CROSS-REFERENCE TO RELATED APPLICATIONS*

This application is a continuation-in-part of my copending application Ser. No. 200,052, filed June 5, 1962, for Associated Dye Salts and Method of Forming Colored Indicia Therewith, now U.S. Pat. No. 3,193,404, issued July 6, 1965, *said application Ser. No. 200,052 is in turn a continuation-in-part of application Ser. No. 800,377, filed Mar. 19, 1959, now abandoned; application Ser. No. 800,377 is in turn a continuation-in-part of application Ser. No. 658,249, filed May 10, 1957, now abandoned; and application Ser. No. 658,249 is a continuation-in-part of applications Ser. Nos. 533,877 and 533,878 both filed Sept. 12, 1955 and both now abandoned.*

The purpose of this invention is to provide a superior colorless recording paper for use in business recording operations. Another purpose of this invention is to provide a completely nonhazardous manifolding sheet which is noninjurious to the skin and clothing of the user. Still another purpose of this invention is to provide a colorless printing surface which yields intensely colored indicia which are stable to high humidities and other conditions normally encountered in office operations.

In recent years considerable effort has been made to improve the handling aspects of business copy papers by introducing supposedly novel types of coatings on paper. These have utilized either new binder compositions in place of the standard wax binders (Green, U.S. 2,299,694; Newman and Schlotzhauer, U.S. 2,820,717) or a metathetical color-forming reaction in place of Crystal Violet dye (Groak, U.S. 2,168,098; Green, U.S. 2,299,693; Davis and Thacker, U.S. 2,646,367; and Davis, U.S. 2,927,040). Most of the proposed metathetical color-forming reactions have proved unsuitable for commercial use; the reason for this is simply that a fundamental necessity of business printing and copying is to obtain a legible print from a very small amount of ink. For this reason, most of the proposed color-forming reactions which are superior to Crystal Violet dye in light-stability or staining characteristics have never achieved any prominent role in the business forms market either because they have inadequate storage stability or because they yield prints of inadequate legibility.

The use of triarylmethane dye derivatives (such as the Crystal Violet Lactone of Davis and Thacker and the Dinitro Crystal Violet Base of Davis) offers certain advantages over the use of the arylmethane dyes themselves; but all of these systems present certain disadvantages as well as advantages in use. The arylmethane dye lactones, for example, have no humidity stability and such poor light-stability that they are always used in conjunction with Benzoyl Leuco Methylene Blue, which yields a more light-stable but less intense aftercolor. The Dinitro Crystal Violet base yields an intense, light-stable print; but the material itself is yellow in color.

Every business recording form consists of two major components associated with a base web: a recording "ink" which renders a legible record and an adhesive ("glue" or "binder") to hold the ink onto or within the base web, which is usually paper but which may be a plastic or artificial fiber web. In self-contained (non-transfer) papers, such as safety-check papers, the adhesive plays a very minor role in the printing operation. In business copy forms the adhesive plays a more important role; for here the adhesive glue must hold a printing ink onto the base web during handling operations yet release the ink under printing pressures. This allows the transfer of the recording ink to a suitable receiving surface to yield a colored indicia (printed record). All forms of business recording are merely systems of printing, small scale though the operation may appear.

The old Chinese proverb that the palest ink is better than the best memory is the axiom upon which modern business office practices are founded. In modern business operations the true value of a colorless recording paper as a printing medium is not to serve merely as an advertising novelty or gimmick but to make possible more efficient business handling procedures and more versatile business forms than can be obtained by the use of colored transfer coatings. It must be remembered, however, that the colored transfer papers (carbon papers) now in use are the standard whereby colorless copy paper prints must be evaluated. Modern carbon papers make very legible indicia of excellent light-stability and excellent humidity-stability; they are relatively inexpensive; and they have good storage life ("shelf life") before use. Carbon papers perform their printing operations very effectively; unfortunately, they are messy to handle, unsightly in appearance, tend to smudge the record in use, and cannot be used at all in the more efficient copy papers demanded by expensive office procedures.

What is needed for business recording operations is a colorless recording paper which yields an intense, easily readable, printed record, which has good storage stability (long shelf life), and which yields records which are not erased by high humidities or normal indoor exposures.

A discovery by the author of the present invention has made available a new series of colorless fluids and colorless recording systems which yield prints comparable in intensity with those obtained with commercial arylmethane dye salts. It has been found that these colorless compositions can be incorporated into recording papers with a wide variety of binders to yield colorless recording papers which ofer considerable advantages over those hitherto known to the art. These colorless copy papers are based on the novel printing system more fully described in my copending aplication, Associated Dye Salts and Method of Forming Colored Indicia Therewith, filed June 5, 1962, Ser. No. 200,052 now U.S. Pat. No. 3,193,404.

The colorless recording papers of the present invention are relatively inexpensive to prepare, stable to long storage before use (have good shelf life), and yield immediate, intense indicia during the printing operation. The indicia are not discharged by water or high humidities, and their light-stability is satisfactory for business use. The papers are not prematurely colored by light; and they can be formulated with completely nonvolatile materials which are nonflammable, nontoxic, and non-injurious to the skin and which do not require extraordinary safety precautions during the preparation and application of the recording materials to the paper.

Description

As previously noted, the colorless dye salts used in the present invention are more fully described in my copending application, Associated Dye Salts and Method of Forming Colored Indicia Therewith, Ser. No. 200,052 filed June 5, 1962 now U.S. Pat. 3,193,404. For solubility reason, the xylenesulfinate and diethylbenzenesulfinate salts of arylmethane dye bases characterized by a logarithmic dissociation constant below 7 are most versatile for general use; but other salts, such as the toluenesulfinate (and other monoalkylarylsulfinates) are satisfactory for many applications. A typical, inexpensive colorless dye salt is the xylenesulfinate salt of Michler's Hydrol (4,4'-bis (dimethylamino) benzhydrol):

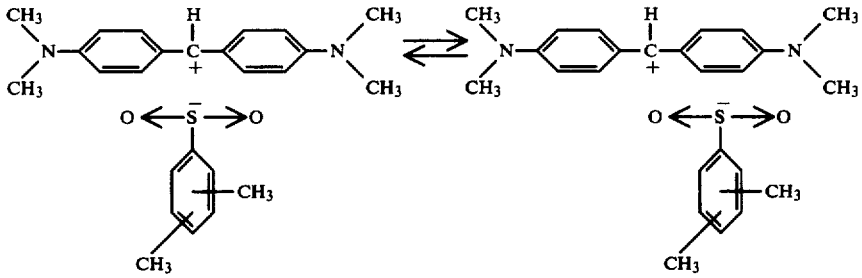

Colorless Blue-Violet

The azide salts are not as light-stable as the sulfinate salts; for most applications, the sulfinate salts are preferred.

The sulfinic acid and hydrazoic acid salts of colored arylmethane dye cations derived from arylmethane dye bases characterized by a logarithmic dissociation constant below 7 normally exist in the colorless associated form; but upon exposure to ionizing conditions (heat, contact with ionizing solids or solvents, etc.), the colored salt is formed by dissociation. The associated sulfinate salts used have good solubility in oleic acid, xylene, diethylbenzene, methyl salicylate, dioctyl phthalate, didecyl phthalate, ditridecyl phthalate and similar solvents. Whereas the acid-base reaction of crystal violet lactone with acid silicates does not occur in oleic acid and similar vehicles, the dissociation of the associated xylenesulfinate salt of Michler's Hydrol to the intensely colored dye cation takes place equally well in oleic acid or methyl salicylate or didecyl phthalate as in xylene when exposed to the ionizing forces present on the surfaces of unfired silicates.

This versatility is a great advantage in colorless copy papers; for the vinyl plasticizers have very low volatility, low toxicity, low viscosity, and their low vapor pressure in coating preparations effectively removes the fire hazards inherent in the use of flammable solvents. The phthalate ester plasticizers especially permit the preparation of papers with long shelf life and which give prints of good stability and which offer no health hazards in their handling.

The chief reason why xylene and diethylbenzene are used in certain commercial copy papers is the need for high solvent power with low fluidity; the recording systems used are oftentimes too inflexible to permit the use of other solvents, which would interfere with the formation of the colored complex involved. In the system of the present invention, however, a dissociation of a preformed salt occurs; and this dissociation is not hindered by the dipole present in oleic acid, methyl salicylate, or didecyl phthalate. Of course, xylene can be, and is, used with great effect in the present invention because of its low price and the prints obtained have good light-stability; but the light-stability and the humidity-stability of the prints obtained with didecyl phthalate are also good; and this solvent has no possibility of injuring the health of the user.

Unlike Michler's Hydrol itself or various auramine derivatives, the colorless dye salts used in the present invention have negligible vapor pressures and are completely non-volatile; for this reason, they do not volatilize in the coating to cause premature coloration, smudge, or bleed. In other words, the negligible vapor pressures of the salts used, which results from the ionic nature of the salt bonding, renders the copy papers of the present invention stable during contact storage and results in long shelf life of the form.

The high intensity of the prints obtained from these colorless films, even from very small amounts of the dye salts, renders their commercial application of great value; for the resultant prints have good legibility. Furthermore, the highly intense prints are obtained at high humidities and are not discharged by dropping into water.

For example, traffic tickets prepared from one commercial copy paper were found by many motorists as merely blank sheets of damp paper stuck beneath their windshields and were thrown away; this caused considerable confusion when they were subsequently summoned to court and fined for failure to appear. This cannot occur with the water-stable prints of the present invention.

The colorless recording sheets of the present invention utilize recording materials which are not in themselves unduly photosensitive and which are not prematurely colored by exposure to light. As the dye salts used are oftentimes easier to prepare and purify than are many arylmethane dyes, the cost of the materials used is in the range of present-day colored copy paper materials. While the prints obtained are not as light-stable as carbon black of phthalocyanine blue, they are in the same range as Crystal Violet dye on paper, which is good enough for busines forms uses. It must be remembered that most business records are ephemeral in nature; that is to say, they are not expected to last forever. Cash register receipt rolls, for example, are rarely kept more than 30 days after use; sales book copies are equally short-lived in their applications. Modern business is no more equipped to save every record than were the ancient Romans, who kept daily records on chalk-covered boards or in water-soluble inks easily removed by a wet sponge and their permanent records inscribed on sheets of marble or bronze.

In other words, the records of the present invention are as stable as they should be. They possess resistance to solar bleaching which is not perfect but which is more than adequate for business copying purposes.

In summary, the colorless recording sheets of the present invention may be fabricated in a variety of ways with an extensive variety of binders, solvents, and additives to serve a very diversified range of applications. They may be self-contained or transfer, one-time or multiple use. The resultant copy paper presents a pleasing appearance, may be handled without fear of staining or dematitis of the skin, may be stored indefinitely with good shelf life, and will yield intense, very legible indicia which are stable to the high humidities and other environmental conditions normally encountered in business forms use.

EXAMPLE 1

An embodiment of this invention is prepared by melting together 35 parts of refined I.G. wax, 15 parts of refined carnauba wax, 10 parts of high melting (155° C.) paraffin wax, and 40 parts of Ditridecyl Phthalate and adding to this at 90° C. an amount of the Xylenesulfinate salt of Michler's Hydrol (4,4'-Bis (Dimethylamino) benzhydrol) equal to 2% of the Ditridecyl Phthalate used. The molten wax mixture is stirred until a clear solution is obtained, and the hot melt is then applied to paper by standard coating procedures. A weight of 6 lbs. per ream is satisfctory although more or less may be used. Pressure-transfer of the wax to a clay-coated receiving sheet gives an immediate deep blue print, which is not decolorized by water. Transfer of the wax to ordinary paper gives a colorless film on the paper which can be colored by briefly heating to over 150° C.

In place of I.G. wax and carnauba wax, one may use as binders other waxes, such as ouricury wax, montan wax, and synthetic oxidized paraffin waxes.

EXAMPLE 2

Another embodiment of this invention for use as a spirit duplicating master is obtained by the use of a transfer sheet which has a coating thereon containing 50% of the colorless dye salt. This coating is prepared by melting together 20 parts of weight of refined carnauba wax, 10 parts by weight of paraffin wax, 20 parts by weight of 150 sec. paraffin oil and adding to this 50 parts by weight of the Toluenesulfinate salt of Michler's Hydrol at 90° C. The hot melt dope may be used as such or a volatile solvent may be incorporated therein to give a more fluid composition. This coating composition is then applied by standard coating procedures to a base web; and the resultant coated transfer sheet may then be used to give a substantially colorless spirit master sheet. Copies made from this master by means of a methanolic take-off fluid onto an active silica-coated receiving sheet or by means of a methanolic solution of Dihydroxydiphenylsulfone onto ordinary paper give blue-violet prints.

EXAMPLE 3

An embodiment of this invention for use as a stylus recording paper is prepared by mixing a finely divided suspension of 3 grams of the Toluenesulfinate salt of Ethyl Hydrol (4,4'-Bis (Diethylamino) benzhydrol) in 100 ml. of water with a finely divided suspension of 3 grams of Diphenolic Acid (Johnson's Wax) in 100 ml. of water containing starch as a binder. This is coated onto paper and air-dried to give a colorless mixture of crystals of the dye salt and the crystalline phenol. When this paper is treated with a volatile polar solvent which is a solvent for both the dye salt and the ionizing chemical, solution of the materials in the solvent, which may be acetone, alcohol, methylethylketone, etc., followed by evaporation of the solvent yields an intensely colored print. Other ionizing chemicals which may be used in place of the Diphenolic Acid are other crystalline phenols such as Dihydroxydiphenylsulfone, benzenesulfonamide, and the carboxylic acid amides. For coloration to occur, the materials must crystallize out together from a polar solvent.

EXAMPLE 4

A 2% solution of the diethylbenzenesulfinate salt of Michler's Hydrol (4,4'-bis (dimethylamino) benzhydrol) in molten refined carnauba wax at 90° C. is prepared. This is poured into hot water (90°–93° C.) containing an emulsifying agent, such as sodium lauryl sulfate; and the colorless carnauba wax solution is thoroughly emulsified in the hot water. The finely divided emulsion is then rapidly cooled to room temperature (ice may be added); the resultant solid wax in water suspension has a very pale tan color. To this is added a suspension of clay in water; an amount of clay equal to the weight of wax may be used or 2–4 times the weight may be used, the amounts are not critical. A small amount of cooked starch solution is added to serve as a binder; and the mixed suspensions are then coated onto paper and air-dried at room temperature to give a substantially colorless paper. Application of heat to selected areas, as in a Thermo-Fax machine, gives a blue-on-white copy of an original where the wax melts and strikes the colorless dye salt onto the ionizing clay to form the colored form of the dye.

EXAMPLE 5

A 2% solution of the hydrazoic acid salt of Michler's Hydrol in dioctyl phthalate is prepared; and this is emulsified in a 20% aqueous solution of polyvinyl alcohol containing a few drops of ammonia, using 2.5 parts by weight of dioctyl phthalate to one part by weight of solid polyvinyl alcohol. The resultant emulsion is coated onto a paper web by standard coating procedures and air-dried to give a substantially colorless transfer sheet. When the coated side is placed in contact with an unfired kaolin-coated paper, pressure applied to the upper side transfers the recording fluid to the kaolin-coated receiving sheet to give a deep blue print which is not discharged by water.

EXAMPLE 6

A 2.5% solution of the diethylbenzenesulfinate salt of Michler's Hydrol (4,4'-bis (dimethylamino) benzhydrol) in warm didecyl phthalate is prepared; and this solution is emulsified in a 20% aqueous solution of polyvinyl alcohol using 2.5 parts by weight of didecyl phthalate solution to one part by weight of solid polyvinyl alcohol. A small amount of glyoxal may be added to harden the coating after it is applied to the paper. The resultant emulsion is coated onto a paper web by standard coating procedures and passed over a heated roller to remove the water. When the coated side is placed in contact with an activated silica-coated receiving sheet or an unfired clay-coated receiving sheet, pressure applied to the upper side transfers the recording fluid to the silica-coated receiving sheet to give an intense blue-violet print which is not discharged by water.

The emulsion may be coated on the reverse of a clay-coated sheet, and the resultant papers may be stacked one on the other to give a manifolding system whereby several copies may be made at one time.

EXAMPLE 7

A 2% solution of the xylenesulfinate salt of Michler's Hydrol in warm didecyl phthalate is prepared; and this is emulsified in a warm (50°-60° C.) 12% aqueous solution of gum arabic using 2.5 to 3.5 parts by weight of didecyl phthalate to one part by weight of solid gum arabic. The resultant emulsion is poured into a 20% gelatin solution at 55° C. and diluted with water to precipitate the gelatin onto the surface of the didecyl phthalate droplets, where it is subsequently insolubilized by cooling to 0°-5° C. and addition of formaldehyde. The encapsulated didecyl phthalate droplets are separated from the supernatant solution and added to a finely-didived dispersion of unfired clay in water, and the mixture is coated onto a base web and air-dried. Pressure with a stylus ruptures the capsules and transfers the didecyl phthalate to the unfired silicate's ionizing surface where the colorless dye salt dissociates to give an intense blue-violet print, which is not discharged by water. Exposure to sunlight under glass for one month gave a print which was still legible. The residual prints obtained from the phthalate plasticizers is very stable because of the formation of a stable after-color of undetermined structure.

EXAMPLE 8

A 2.5% solution of the xylenesulfinate salt of Michler's Hydrol in warm diethylbenzene is prepared; and this is emulsified at 50° C. in a 12% aqueous gum arabic solution using 2.5-3.5 parts by weight of diethylbenzene solution to one part by weight of solid gum arabic. The resultant emulsion is poured into a warm (50°-60° C.) 20% gelatin solution and diluted with water to precipitate the gelatin onto the diethylbenzene droplets, where it is subsequently insolubilized by cooling to 5° C. and addition of formaldehyde. The encapsulated diethylbenzene droplets are then centrifugally separated from the supernatant solution and added to a suspension of an unfired silicate in water. The mixture is then impregnated in a porous paper web (such as blotting paper), which is then air-dried to give a substantially colorless recording sheet. Several sheets of this paper are stacked together to form a multiple-copy unit; and pressure with a stylus on the top sheet yields legible records on all of the sheets of the manifolding system. These sheets print equally well on machine impact (typewriter paper) or frictional pressure (pencil copy paper). The prints have high intensity and are not discharged by water. The light-stability is good.

EXAMPLE 9

A substantially colorless plastisol one-time copy transfer sheet is obtained by coating a plastisol dispersion prepared by adding 50 parts of a warm 2.5% solution of the xylenesulfinate salt of Michler's Hydrol in didecyl phthalate to a solution of 25 parts of vinyl resin (Geon 427) in 225 parts of acetone with thorough stirring. More solvent may be added if necessary to adjust the fluidity. The resultant dispersion is coated onto paper, and the acetone is evaporated at room temperature to give a substantially colorless plastisol coating. When this transfer sheet is used with an unfired silicate receiving sheet, pressure applied to the upper side transfers the recording fluid to the receiving sheet to give a deep blue-violet print, which is not discharged by water. This plastisol copy paper may be freely handled without leaving stains on the hands and will not cause dermatitis.

A yellow, non-staining transfer sheet which gives deep blue-black prints of excellent light-stability is obtained with the use of the xylenesulfinate salt of dinitro crystal violet base in place of the Michler's Hydrol colorless salt.

EXAMPLE 10

A plastisol transfer sheet is prepared by coating a plastisol dispersion obtained by adding 50 parts of a 3% solution of the diethylbenzenesulfinate salt of ethyl hydrol (4,4'-bis(diethylamino-benzhydrol) in dioctyl phthalate to a solution of 25 parts of vinyl resin (Geon 421) in 250 parts of acetone with thorough stirring. The resultant dispersion is coated onto paper, and the acetone is evaporated at room temperature to give a substantially colorless plastisol coating. When this transfer sheet is used in conjunction with an activated silica-coated receiving sheet, a deep blue print is obtained. As the N-ethylated dyes are not as intense as the N-methylated dyes or as stable, the colorless salts of N-ethylated dyes are not as satisfactory as those of N-methylated dyes. Weight for weight, the N-methylated dyes give more intense colors than the higher molecular weight N-ethylated dyes.

For commercial production purposes, the examples given may be modified to take into account the usual variations encountered with commercial coating materials and large-scale coating procedures. Because it is extremely difficult to reproduce small-scale coatings on large-scale production equipment, the examples given are to be considered subject to the usual variation for actual production purposes.

In commercial work the results obtained with various types of binders for the colorless printing medium used in the present invention must be evaluated in terms of the performance and costs advantages offered by one type of binder over another for a specific commercial application. Hot melt coatings using waxes and resins, for example, are cheap to prepare and have no solvent removal problems to be considered. In the standard hot-melt coating procedure the hot dope is coated onto moving paper, excess dope is removed by a scraper blade; and the coating rapidly hardens by cooling. While this method is inexpensive and is the one presently most often encountered in forms coatings, contact smudge and frictional smudge tend to be higher than with other types. As this type of coating can be made readily solvent-soluble, however, it is widely used and offers advantages when used for spirit duplicating masters.

The water-soluble, or water-dispersible, polymers, which class includes the hydrophilic colloids, utilize a non-flammable solvent (water); and with the vinyl plasticizers as an internal phase, the resultant coating compositions are completely nonflammable at all times under operating conditions. While the low cost of xylene, diethylbenzene, and similar materials make them attractive for certain applications, they do present a fire hazard as well as a toxic fumes hazard, whereas the vinyl plasticizers are nontoxic and nonflammable (many have flash points above the ignition point of paper itself). The prints obtained from films using insolubilized water-dispersed polymers as binders are intense, sharp, humidity-stable, and completely satisfactory for office use.

As one valuable applicable of the colorless recording sheet of the present invention is in those areas where colored indicia are obtained in self-contained papers by internal transfer of an ink rather than external transfer to another sheet, one great advantage of the present colorless recording sheet is that when all of the materials are incorporated into one sheet, there is no premature coloration by volatilization or photochemical action; hence, there is no rapid deterioration before use and no rapid loss of shelf life.

It should be clearly understood that the invention is not limited to the particular examples cited but can be used with a wide variety of binders, coating techniques, and additives to prepare colorless recording sheets and manifolding systems which function with colorless dye salts as the recording medium.

Having described my invention, I claim:

1. A transfer sheet having upon its surface a coating containing a substantially colorless dye salt derived from an organic sulfinic acid and an arylmethane dye base characterized by a logarithmic dissociation constant below 7, which upon transfer to a suitable receiving sheet is dissociated to the intensely colored ionic form of the dye to furnish a colored print.

2. A transfer sheet having upon its surface a coating containing a substantially colorless dye salt derived from an organic sulfinic acid and an N,N'-alkylated-4,4'-diaminobenzhydrol, which upon transfer to a suitable receiving sheet is dissociated to the intensely colored ionic form of the dye to furnish a colored print.

3. A manifolding sheet comprising a web having a coating on one side thereof, said coating comprising a solvent and a colorless dye salt derived from an organic sulfinic acid and an arylmethane dye base characterized by a logarithmic dissociation constant below 7.

4. A manifolding sheet comprising a web having a coating on one side thereof, said coating comprising a solvent and a colorless dye salt derived from an organic sulfinic acid and an N,N'-alkylated-4,4'-diaminobenzhydrol.

5. A transfer sheet having upon its surface a coating containing a substantially colorless dye salt derived from hydrazoic acid and an arymethane dye base characterized by a logarithmic dissociation constant below 7, which upon transfer to a suitable receiving sheet is dissociated to the intensely colored ionic form of the dye to furnish a colored print.

6. A transfer sheet having upon its surface a coating containing a substantially colorless dye salt derived from hydrazoic acid and an N,N'-alkylated-4,4'-diamino benzhydrol, which upon transfer to a suitable receiving sheet is dissociated to the intensely colored ionic form of the dye to furnish a colored print.

7. A manifolding sheet comprising a web having a coating on one side thereof, said coating comprising a solvent and a colorless dye salt derived from hydrazoic acid and an arylmethane dye base characterized by a logarithmic dissociation content below 7.

8. A manifolding sheet comprising a web having a coating on one side thereof, said coating comprising a solvent and a colorless dye salt derived from hydrazoic acid and an N,N'-alkylated-4,4'-diaminobenzhydrol.

9. A transfer sheet having upon its surface a coating containing a substantially colorless dye salt wherein the cation is the intensely colored cation of an arylmethane dye base characterized by a logarithmic dissociation constant below 7 and the anion is chosen from the group consisting of hydrazoic acid anion and organic sulfinic acid anion.

10. A transfer sheet having upon its surface a coating containing a substantially colorless dye salt wherein the cation is an N,N'-alkylated-4,4'-diaminobenzhydryl cation and the anion is chosen from the group consisting of hydrazoic acid anion and organic sulfinic acid anion.

11. A transfer sheet having upon its surface a coating containing the substantially colorless salt of toluenesulfinic acid and 4,4'-Bis (Dimethylamino) benzhydrol.

12. A transfer sheet having upon its surface a coating containing the substantially colorless salt of xylenesulfinic acid and 4,4'-Bis (Dimethylamino) benzhydrol.

13. A transfer sheet having upon its surface a coating containing the substantially colorless salt of diethylbenzene-sulfinic acid and 4,4'-Bis (Dimethylamino) benzhydrol.

14. A manifolding sheet comprising a web having a coating on one side thereof, said coating comprising a solvent and a colorless dye salt wherein the cation is the intensely colored cation of an arylmethane dye base characterized by a logarithmic dissociation constant below 7 and the anion is an organic sulfinic acid anion.

15. The manifolding sheet of claim 14 wherein the coating comprises a hydrophobic fluid dispersed in the form of discrete droplets in a hydrophilic colloid binder.

16. The manifolding sheet of claim 14 wherein the coating comprises a hard waxy material and a hydrophobic plasticizing fluid of low ionizing power.

[17. A recording paper comprising a base web consisting essentially of intermeshed paper fibers, said fibers impregnated with a recording composition containing as a constituent thereof a substantially colorless dye salt wherein the cation is the intensely colored cation of an arylmethane dye base characterized by a logarithmic dissociation constant below 7 and the anion is an organic sulfinic acid anion.]

[18. A recording paper comprising a base web consisting essentially of intermeshed paper fibers, said fibers impregnated with a recording composition containing as a constituent thereof a substantially colorless dye salt wherein the cation is an N,N'-alkylated-4,4'-diaminobenzhydryl cation and the anion is an organic sulfinic acid anion.]

* * * * *